US012688517B2

(12) United States Patent
Liu et al.

(10) Patent No.: US 12,688,517 B2
(45) Date of Patent: Jul. 21, 2026

(54) METHOD AND APPARATUS FOR TRAINING ONLINE PREDICTION MODEL, DEVICE AND STORAGE MEDIUM

(71) Applicant: Beijing Baidu Netcom Science and Technology Co., Ltd., Beijing (CN)

(72) Inventors: Haocheng Liu, Beijing (CN); Yuan Li, Beijing (CN); Guobin Xie, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 1446 days.

(21) Appl. No.: 17/213,066

(22) Filed: Mar. 25, 2021

(65) Prior Publication Data

US 2021/0248513 A1 Aug. 12, 2021

(30) Foreign Application Priority Data

Sep. 2, 2020 (CN) .......................... 202010911608.5

(51) Int. Cl.
*G06Q 30/0251* (2023.01)
*G06F 18/213* (2023.01)
(Continued)

(52) U.S. Cl.
CPC ....... *G06Q 30/0256* (2013.01); *G06F 18/213* (2023.01); *G06F 18/214* (2023.01);
(Continued)

(58) Field of Classification Search
CPC ........... G06Q 30/0256; G06Q 30/0201; G06N 20/00; G06N 5/04; H04L 67/535; G06F 18/213
See application file for complete search history.

(56) References Cited

U.S. PATENT DOCUMENTS 9,020,866 B1 * 4/2015 Zhou .................. G06Q 30/0625
706/13
2018/0082191 A1 * 3/2018 Pearmain ............... G06N 20/00
(Continued)

FOREIGN PATENT DOCUMENTS

CN 110046952 A 7/2019
CN 110880124 A 3/2020
(Continued)

OTHER PUBLICATIONS

Cheng et al., "Wide & Deep Learning for Recommender Systems", pp. 1-3 (Year: 2016).*
(Continued)

*Primary Examiner* — David Yi
*Assistant Examiner* — Andrew Bracero
(74) *Attorney, Agent, or Firm* — ICE MILLER LLP; Justin D. Swindells

(57) ABSTRACT

A method and apparatus for training an online prediction model are provided. The method may include: acquiring an offline sample feature and an online sample feature of a user, the offline sample feature including a user portrait feature; offline training to obtain an offline recommendation model, based on the offline sample feature and the online sample feature of the user; acquiring a latest online feature of the user, and online training to obtain an online learning model based on the latest online feature of the user, the online learning model being used to adapt the latest online feature for use as an online sample feature to be input into the trained offline recommendation model; and synchronizing the offline recommendation model to online, and inputting the latest online feature output by the online learning model into the offline recommendation model to generate an online prediction model.

18 Claims, 6 Drawing Sheets

(51) Int. Cl.

| | | |
|---|---|---|
| *G06F 18/214* | (2023.01) | |
| *G06N 5/04* | (2023.01) | |
| *G06N 20/00* | (2019.01) | |
| *G06Q 30/0201* | (2023.01) | |
| *H04L 67/50* | (2022.01) | |

(52) U.S. Cl.
CPC .............. *G06N 5/04* (2013.01); *G06N 20/00* (2019.01); *G06Q 30/0201* (2013.01); *H04L 67/535* (2022.05)

(56) References Cited

U.S. PATENT DOCUMENTS

| | | | | |
|---|---|---|---|---|
| 2018/0247362 A1* | 8/2018 | Guo | ...................... | G06N 3/084 |
| 2018/0374138 A1 | 12/2018 | Mohamed | | |
| 2019/0336061 A1 | 11/2019 | Harrer et al. | | |

FOREIGN PATENT DOCUMENTS

| | | | | | |
|---|---|---|---|---|---|
| CN | 111080413 | A | | 4/2020 | |
| EP | 1836555 | A2 * | 9/2007 | ............. | G06Q 30/02 |
| EP | 3506184 | A1 * | 7/2019 | ......... | G06Q 30/0241 |
| KR | 102063167 | | | 1/2020 | |

OTHER PUBLICATIONS

Liu et al., "Feature Generation by Convolutional Neural Network for Click-Through Rate Prediction", pp. 1,6, and 9 (Year: 2019).*

Cheng et al., "Wide & Deep Learning for Recommender Systems" (Year: 2016).*

Guo et al., "DeepFM: A Factorization-Machine based Neural Network for CTR Prediction" (Year: 2017).*

Liu et al., "Feature Generation by Convolutional Network for Click-Through Rate Prediction" (Year: 2019).*

Ni et al., "Perceive Your Users in Depth: Learning Universal User Representations from Multiple E-commerce Tasks" (Year: 2018).*

Singhal et al., "Fast Online 'Next Best Offers' using Deep Learning" (Year: 2019).*

Wang et al., "Learning to Estimate the Travel Time" (Year: 2018).*

Extended European Search Report for Application No. 21174389.3, dated Oct. 19, 2021 (10 pages).

Wang, Yiping, et al., The Recommendation Method Based on Improved Wide and Deep Model, Computer Applications and Software, vol. 35, No. 11. Nov. 2018. English machine translation of abstract.

Guowen Xu, et al., "Verify Net: Secure and Verifiable Federated Learning," IEEE Transactions on Information Forensics and Security, vol. 15, 2020, pp. 911-926.

Andrew Hard, et al., "Federated Learning for Mobile Keyboard Prediction," arXivLabs, arXiv:1811.03604v2, Feb. 28, 2019, 7 pages.

* cited by examiner

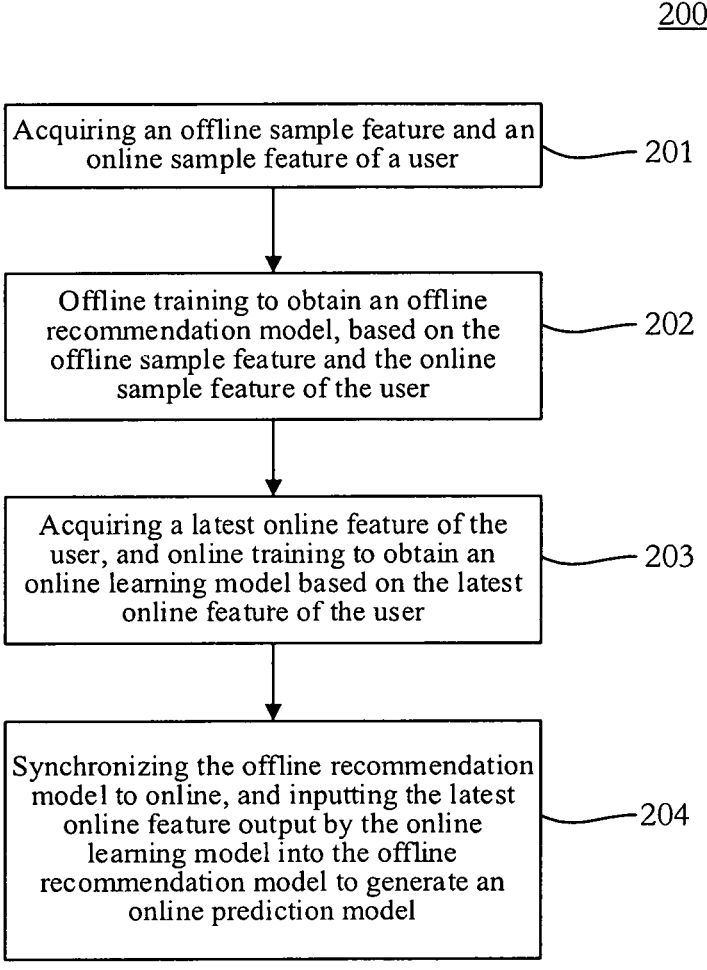

200

Acquiring an offline sample feature and an online sample feature of a user — 201

Offline training to obtain an offline recommendation model, based on the offline sample feature and the online sample feature of the user — 202

Acquiring a latest online feature of the user, and online training to obtain an online learning model based on the latest online feature of the user — 203

Synchronizing the offline recommendation model to online, and inputting the latest online feature output by the online learning model into the offline recommendation model to generate an online prediction model — 204

Fig. 2

METHOD AND APPARATUS FOR TRAINING ONLINE PREDICTION MODEL, DEVICE AND STORAGE MEDIUM

CROSS-REFERENCE TO RELATED APPLICATIONS

This application claims priority to Chinese Patent Application No. 202010911608.5, filed on Sep. 2, 2020, titled "Method and apparatus for training online prediction model, device, and storage medium," which is hereby incorporated by reference in its entirety.

TECHNICAL FIELD

The present disclosure relates to the field of computer technology, in particular to the field of machine learning technology, and more particular to a method and apparatus for training an online prediction model, a device, and a storage medium.

BACKGROUND

Recommendation systems use e-commerce websites to provide users with goods information and suggestions, help the users decide what products to buy, and simulate sales staff to help customers complete purchase process. Personalized recommendation is to recommend information and goods that users may be interested in based on interest characteristics and purchase behaviors of the users.

SUMMARY

Embodiments of the present disclosure provide a method and apparatus for training an online prediction model, a device, and a storage medium.

According to a first aspect, a method for training an online prediction model is provided. The method includes: acquiring an offline sample feature and an online sample feature of a user, the offline sample feature including a user portrait feature; offline training to obtain an offline recommendation model, based on the offline sample feature and the online sample feature of the user; acquiring a latest online feature of the user, and online training to obtain an online learning model based on the latest online feature of the user, the online learning model being used to adapt the latest online feature for use as an online sample feature to be input into the trained offline recommendation model; and synchronizing the offline recommendation model to online, and inputting the latest online feature output by the online learning model into the offline recommendation model to generate an online prediction model.

According to a second aspect, an apparatus for training an online prediction model is provided. The apparatus includes: an acquisition unit, configured to acquire an offline sample feature and an online sample feature of a user, the offline sample feature comprising a user portrait feature; an offline training unit, configured to offline train to obtain an offline recommendation model, based on the offline sample feature and the online sample feature of the user; an online training unit, configured to acquire a latest online feature of the user, and online train to obtain an online learning model based on the latest online feature of the user, the online learning model being used to adapt the latest online feature for use as an online sample feature to be input into the trained offline recommendation model; and a model generation unit, configured to synchronize the offline recommendation model to online, and input the latest online feature output by the online learning model into the offline recommendation model to generate an online prediction model.

According to a third aspect, an electronic device is provided. The electronic device includes: one or more processors; and a storage apparatus storing one or more programs. The one or more programs, when executed by the one or more processors, cause the one or more processors to implement the method according to any implementation in the first aspect.

According to a fourth aspect, a computer readable storage medium storing a computer program thereon is provided. The program, when executed by a processor, implement the method according to any implementation in the first aspect.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand the present solution and do not constitute a limitation to the present disclosure.

FIG. 2 is a schematic flowchart of a method for training an online prediction model according to an embodiment of the present disclosure;

DETAILED DESCRIPTION OF EMBODIMENTS

The following describes example embodiments of the present disclosure with reference to the accompanying drawings, which include various details of the embodiments of the present disclosure to facilitate understanding, and should be regarded as merely examples. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

Figure 1:
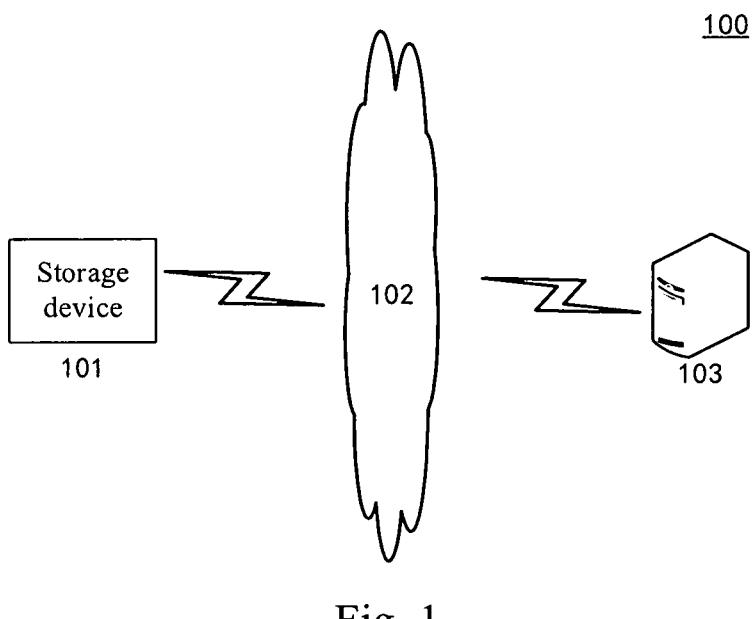
FIG. 1 is an example system architecture in which embodiments of the present disclosure may be implemented.

FIG. 1 illustrates an example system architecture 100 of a method for training an online prediction model or an apparatus for training an online prediction model in which embodiments of the present disclosure may be implemented.

As shown in FIG. 1, the system architecture 100 may include a storage device 101, a network 102, and a server 103. The network 102 is used to provide a communication link medium between the storage device 101 and the server 103. The network 102 may include various types of connections, such as wired, wireless communication links, or optic fibers.

The storage device 101 may interact with the server 103 through the network 102. When the network 102 is in a disconnected state, the server 103 may also directly execute instructions issued by the storage device 101. The storage device 101 may provide an offline recommendation model, user offline data, etc., including but not limited to user terminal, database, and so on. When the network 102 is in the disconnected state, the server 103 may perform steps of training an offline recommendation model, including: acquiring an offline sample feature and an online sample feature of a user, the offline sample feature including a user portrait feature; offline training to obtain an offline recommendation model, based on the offline sample feature and the online sample feature of the user.

The server 103 may provide various services. For example, the server 103 may acquire user online data from the storage device 101 through the network 102. The server 103 may also perform comprehensive analysis and other processing on the offline recommendation model acquired from the storage device 101 and the user online data obtained from the storage device 101 through the network 102, to generate a processing result (for example, generating an online prediction model).

It should be noted that the server 103 may be hardware or software. When the server 103 is hardware, it may be implemented as a distributed server cluster composed of a plurality of servers, or as a single server. When the server 103 is software, it may be implemented as a plurality of software programs or software modules (for example, for providing distributed services), or as a single software program or software module, which is not specifically limited herein.

It should be noted that the method for training an online prediction model provided in embodiments of the present disclosure is generally performed by the server 103. Accordingly, the apparatus for training an online prediction model is generally provided in the server 103.

It should be understood that the number of storage devices, networks, and servers in FIG. 1 is merely illustrative. Depending on the implementation needs, there may be any number of storage devices, networks, and servers. When the server 103 stores the offline recommendation model and the user offline data, the system architecture 100 may not be provided with the storage device 101 and the network 102.

With further reference to FIG. 2, illustrating a flow 200 of a method for training an online prediction model according to an embodiment of the present disclosure. The method for training an online prediction model includes the following steps.

Step 201, acquiring an offline sample feature and an online sample feature of a user.

In the present embodiment, the offline sample feature of the user refers to a feature obtained by processing an offline sample of the user when the user is disconnected from the network; and the online sample feature of the user refers to after synchronizing an online sample of the user acquired when the user is connected with the network to an offline sample of the user, a feature obtained by processing the synchronized offline sample of the user when the user is disconnected from the network. Here, synchronizing an online sample of the user to an offline sample of the user refers to, based on the network or a data synchronization system, a certain online sample of the user may still be used when the user is in an offline state. For example, the online sample of the user may be copied to a local device. Here, the online sample of the user may be an operation behavior of the user in an online state. For example, the user searches for "hot pot" on the Internet, then the keyword searched by the user this time may be used as the online sample.

The offline sample feature or the online sample feature of the user includes but is not limited to user portrait feature. An executing body (for example, the server 103 in a disconnected state from the network 102 in FIG. 1) may obtain a feature of the offline sample by processing the user offline sample. For example, the executing body may use feature engineering in machine learning to convert the user offline sample to a feature that can be processed by a computer. The user offline sample includes but is not limited to user portrait, and the like. The user portrait includes, but is not limited to: user gender, user age, user income, user surfing online times, user search times, user search keyword, user clicked website address, user interest tag, user APP list, and the like.

Step 202, offline training to obtain an offline recommendation model, based on the offline sample feature and the online sample feature of the user.

In the present embodiment, the acquired offline sample feature of the user is used as a training sample set. The offline recommendation model may be obtained by training an existing machine learning model using a machine learning method and the training sample set. For example, an "XGBoost+logic regression" model or a Wide&Deep model may be used. Extreme Gradient Boosting (XGBoost) is a boosting tree scalable machine learning system, and XGBoost model is a tree integration model. Wide&Deep model includes Wide layer/model and Deep layer/model. The Wide model is a wide linear model, and the Deep model is a deep neural network.

In the present embodiment, the offline sample feature may be input into the XGBoost model or the Deep layer in the Wide&Deep model for training, and a parameter of the XGBboost model or the Deep model may be adjusted, for example, adjusting the parameter using a gradient descent method, or a back propagation method. For example, if the offline recommendation model uses the "XGBoost+logic regression" model, a training process of the offline recommendation model may be: inputting the offline sample feature into the XGBoost and then performing feature combination encoding; performing feature encoding on the online sample feature; splicing the online sample feature after feature encoding and a combination code of the offline sample feature output by the XGBoost; and inputting the spliced code into the logic regression for prediction training. For example, if the offline recommendation model uses the Wide&Deep model, a training process of the offline recommendation model may be: inputting the offline sample feature into the Deep layer; performing feature engineering on the online sample feature; inputting the online sample feature after feature engineering directly into the Wide layer, and splicing an output of the Wide layer and an output of the Deep layer and then inputting the spliced output into the logic regression for prediction training.

In the present embodiment, the offline recommendation model may output a click-through rate or a recommended ranking of the user. Preferably, a loss is calculated between the click-through rate and an actual click-through rate, or between the recommended ranking output based on the offline recommendation model and actual recommended ranking, based on the loss, the gradient descent method is used to iteratively optimize a parameter of the offline recommendation model, so that the output result of the offline recommendation model obtained by training is more accurate.

In the present embodiment, since the offline sample feature is relatively stable, the XGBboost model or Deep model trained based on the offline sample feature is also relatively stable. When using the trained XGBboost model or Deep model, there is no need to adjust the model parameter.

Step 203, acquiring a latest online feature of the user, and online training to obtain an online learning model based on the latest online feature of the user.

In the present embodiment, the latest online feature of the user refers to a feature obtained by processing a current online sample of the user acquired when the user is connected to the network. For example, the current online sample of the user may be obtained by analyzing a current real-time operation behavior of the user (online real-time behavior data of the user). For example, the current real-time operation behavior of the user includes current search keyword of the user, current clicked website address of the user, feedback on current advertising display of the user, or the like. The online learning model may use the machine learning method and the latest online feature to train the existing machine learning model to obtain the online learning model. Preferably, the latest online feature may be synchronized to an offline feature library, which stores offline sample feature(s). The so-called synchronizing to an offline feature library refers to copying the latest online feature to the offline feature library based on the network or the data synchronization system. The synchronized latest online feature may be used as the online sample feature to continue offline training the offline recommendation model, so as to make full use of the real-time behavior data of the user for fine-tuning of the model and improve a generalization effect of the model.

Step 204, synchronizing the offline recommendation model to online, and inputting the latest online feature output by the online learning model into the offline recommendation model to generate an online prediction model.

In the present embodiment, synchronizing the offline recommendation model to online refers to based on the network or the data synchronization system, the trained offline recommendation model is made consistent with a recommendation model online, that is, the trained offline recommendation model is converted to an online recommendation model. Then, the latest online feature output by the online learning model is input into the offline recommendation model/online recommendation model for prediction training to generate the online prediction model. Preferably, in the case of using an "XGBoost+logic regression" offline recommendation model, an online machine learning algorithm (FTRL) may be used to adjust the latest online feature of the user, so that the latest online feature is adapted to be used as the online sample feature for feature encoding, thereby realizing fine-tuning of the latest online feature of the user; or, in the case of using a Wide&Deep offline recommendation model, a parameter of the Wide layer is adjusted, so that the latest online feature is adapted to be input into the Wide layer as the online sample feature, thereby realizing fine-tuning of the latest online feature of the user. In this preferred embodiment, when using the "XGBoost+logic regression" or Wide&Deep offline recommendation model for online learning, there is no need to adjust the existing parameter of the model, only the latest online feature of the user needs to be fine-tuned to complete the training of the online prediction model, so as to make full use of the real-time behavior data of the user for fine-tuning of the model and improve the generalization effect of the model.

Compared with the prior art, the embodiment of the present disclosure divides a generation algorithm of the online prediction model into two parts, offline learning and online learning, and uses the online real-time behavior data of the user to optimize the online prediction model and improve a fitting effect of the model.

Figure 3:
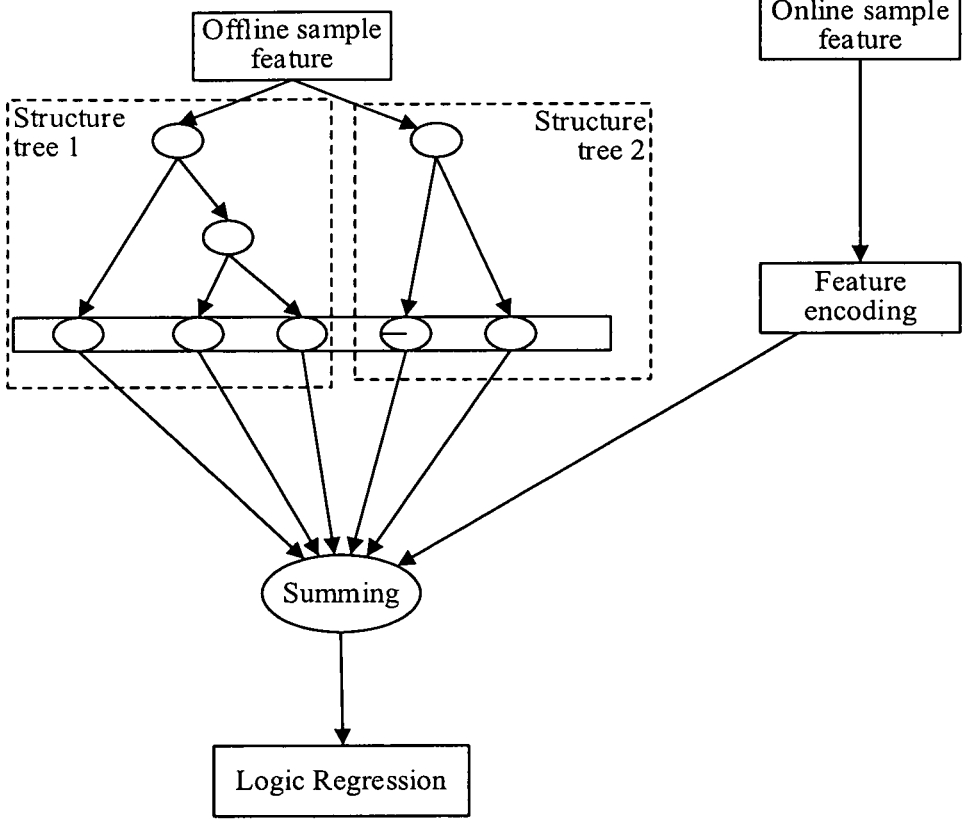
FIG. 3 is a method schematic diagram of an embodiment of training an offline recommendation model based on an XGBoost model.

With further reference to FIG. 3, illustrating a method schematic diagram of an embodiment of training an offline recommendation model based on an XGBoost model.

In the present embodiment, the XGBoost model is adopted, which uses a decision tree model as a base classifier and uses two trees: structure tree 1 and structure tree 2. The input of the model is the offline sample feature of the user, the feature data is first classified in the first tree (structure tree 1), and may eventually fall into a leaf node. A resulting value of the leaf node is an output value of the first tree, then the second tree (structure tree 2) is used to perform the same operation, and finally the output values of all the trees are summed. The online sample feature of the user after feature encoding is summed with the output values of all the trees, and finally a sum result is input into the logic regression for prediction training.

Using the present embodiment, when using the offline recommendation model for online learning, the XGBoost model has been pre-trained, and there is no need to update the model parameter, only the latest online feature of the user needs to be fine-tuned for parameter online, so as to make full use of the real-time behavior data of the user for fine-tuning of the model and improve the generalization effect of the model.

Figure 4:
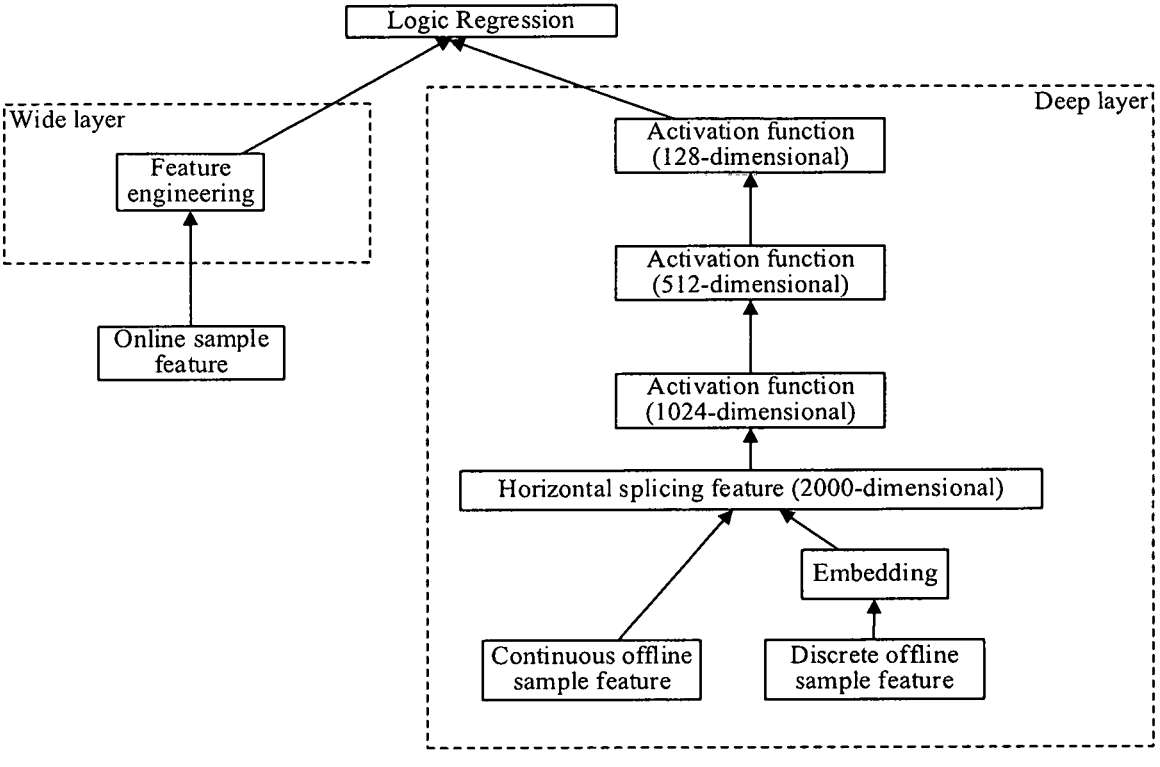
FIG. 4 is a method schematic diagram of an embodiment of training an offline recommendation model based on a Wide&Deep model.

With further reference to FIG. 4, illustrating a method schematic diagram of an embodiment of training an offline recommendation model based on a Wide&Deep model.

In the present embodiment, the Wide&Deep model is adopted, where an input of a Deep layer (for example, DNN) of the model is the offline sample feature of the user, and an input of a Wide layer of the model is the online sample feature of the user. The Wide layer corresponds to a linear model, and the input feature may be a continuous feature or a sparse discrete feature. The Deep layer corresponds to a DNN model, and each feature corresponds to a low-dimensional real number vector, which is called feature embedding. The DNN model adjusts a weight of a hidden layer through back propagation, and updates the feature embedding. An output of the entire Wide&Deep model is a superposition of a linear output and an output of the DNN model. The Wide layer and the Deep layer only need to each focus on what they are good at. The Wide layer is memorized through a cross combination of discrete features, and the Deep layer is generalized through the feature embedding, so that the size and complexity of a single model can also be controlled, and an overall performance of the model can still be improved.

In the present embodiment, the offline sample feature of the user includes a continuous feature and a discrete feature. For the continuous feature, embedding is not required; and for a discrete offline sample feature (such as a high-dimensional sparse feature), embedding is required first. As shown in FIG. 4, for the continuous offline sample feature, horizontal splicing may be directly performed; and for the discrete offline sample feature, embedding needs to be performed first, and then horizontal splicing with the continuous offline sample feature is performed. For example, the continuous offline sample feature includes: age, income, surfing online times, search times, and the like; and the discrete offline sample feature includes: search keyword, clicked website ID, interest tag, App list, and the like. After horizontal splicing of the continuous offline sample feature and the discrete offline sample feature (after embedding), a 2000-dimensional vector is formed; then the spliced feature vector is input into a three-layer fully connected DNN and activation function; and finally an output value of the Deep layer is input into the logic regression for prediction training. The online sample feature of the user is input into the Wide layer, and the online sample feature after feature engineering is also input into the logic regression for prediction training.

Using the present embodiment, when using the offline recommendation model for online learning, the Deep layer in the Wide&Deep model has been pre-trained, and there is no need to update the parameter of the Deep layer, only the parameter of the Wide layer is fine-tuned and the latest online feature of the user is inputted into the Wide layer, so as to make full use of the real-time behavior data of the user for fine-tuning of the model and improve the generalization effect of the model.

Figure 5:
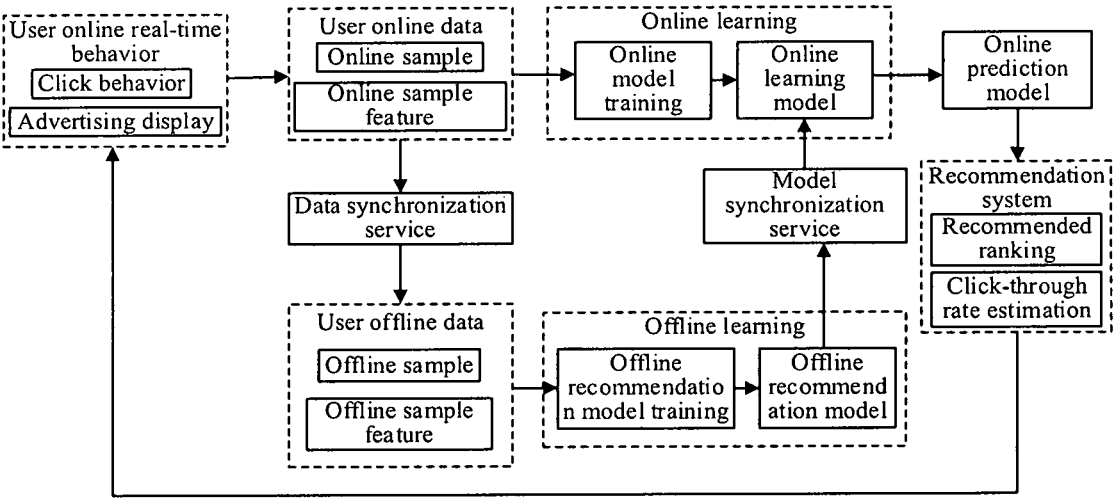
FIG. 5 is a schematic diagram of an application scenario of the method for training an online prediction model according to an embodiment of the present disclosure.

With further reference to FIG. 5, illustrating a schematic diagram of an application scenario of the method for training an online prediction model according to an embodiment of the present disclosure.

In the present embodiment, the architecture of a personalized recommendation system in the marketing field is shown. The recommendation system includes two parts: online learning and offline learning. The system acquires user online data through a user real-time behavior, where the user real-time behavior includes a user click behavior and an advertising display. The user online data includes an online sample of the user, and an online sample feature of the user is obtained by analyzing and processing the online sample. Using a data synchronization service, the online sample feature of the user may be synchronized to user offline data, and the user offline data is used as the online sample feature of the user to train an offline recommendation model. The user offline data includes an offline sample of the user, and an offline sample feature of the user is obtained by analyzing and processing the offline sample. The offline sample of the user mainly includes a user portrait and so on. Offline learning is based on the user offline data (including the online sample feature of the user synchronized to the user offline data) to train the offline recommendation model. In online learning, the trained offline recommendation model is synchronized to online (using the data synchronization service); at the same time, the system acquires a latest real-time behavior of the user, and extracts a latest online feature of the user from the latest real-time behavior. The latest online feature of the user also belongs to the user online data, and is trained based on the latest online feature of the user to obtain an online learning model. The trained online learning model is used to optimize the offline recommendation model and improve a fitting effect of the model. The optimized offline recommendation model is the online prediction model, which may empower a recommended ranking and click-through rate estimation in a recommendation system business flow. The click behavior and advertising display of the user in the recommendation system may also be used as a new online sample of the user, so as to continuously using the online real-time behavior data of the user to optimize the online model. Compared with traditional recommendation engines, the recommendation system has significant improvement in response rate and click-through rate.

Figure 6:
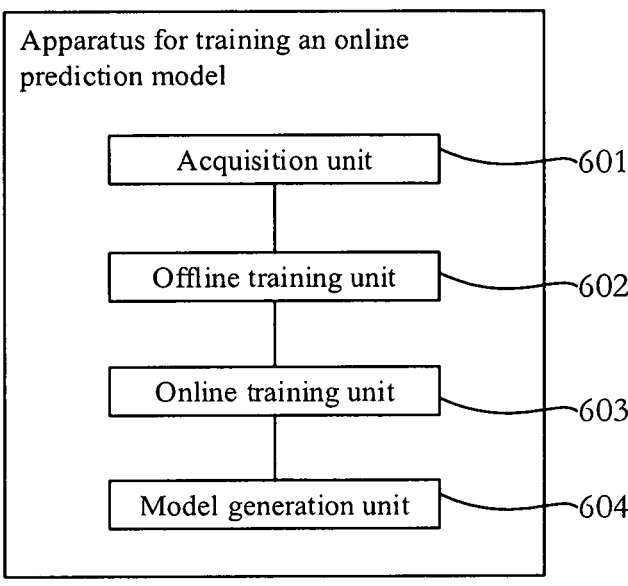
FIG. 6 is a schematic structural diagram of a an apparatus for training an online prediction model according to an embodiment of the present disclosure.

With further reference to FIG. 6, as an implementation of the method shown in the above figures, an embodiment of the present disclosure provides an apparatus for training an online prediction model, and the apparatus embodiment corresponds to the method embodiment as shown in FIG. 2. The apparatus may be specifically applied to various electronic devices.

As shown in FIG. 6, the apparatus for training an online prediction model of the present embodiment includes: an acquisition unit 601, configured to acquire an offline sample feature and an online sample feature of a user, the offline sample feature including a user portrait feature; an offline training unit 602, configured to offline train to obtain an offline recommendation model, based on the offline sample feature and the online sample feature of the user; an online training unit 603, configured to acquire a latest online feature of the user, and online train to obtain an online learning model based on the latest online feature of the user, the online learning model being used to adapt the latest online feature for use as an online sample feature to be input into the trained offline recommendation model; and a model generation unit 604, configured to synchronize the offline recommendation model to online, and input the latest online feature output by the online learning model into the offline recommendation model to generate an online prediction model.

In the present embodiment, in the apparatus for training an online prediction model: for the specific processing and technical effects of the acquisition unit 601, the offline training unit 602, the online training unit 603 and the model generation unit 604, reference may be made to the relevant descriptions of steps 201-204 in the corresponding embodiment of FIG. 2 respectively, and repeated description thereof will be omitted.

In some alternative implementations of the present embodiment, the offline recommendation model includes an XGboost model or a Wide&Deep model.

In some alternative implementations of the present embodiment, the apparatus further includes: a data synchronization unit, configured to synchronize the latest online feature of the user or the online sample feature of the user to an offline feature library. The offline feature library stores the offline sample feature of the user.

In some alternative implementations of the present embodiment, the apparatus further includes: an online sample feature generation unit, configured to determine the online sample feature of the user based on a user online real-time behavior, where the user online real-time behavior includes a user online operation behavior.

In some alternative implementations of the present embodiment, the apparatus further includes: a result output unit, configured to determine a recommended ranking or a click-through rate estimation in a recommendation system, based on an output of the online prediction model.

In some alternative implementations of the present embodiment, the offline recommendation model is an XGBoost model, and the offline training unit is further configured to: input the offline sample feature into the XGBoost to generate a feature code of the offline sample feature; perform feature encoding on the online sample feature, and splice a feature code of the online sample feature and a combination code of the offline sample feature; and input a splicing result into a logic regression for prediction training, to obtain the trained offline recommendation model.

In some alternative implementations of the present embodiment, the online training unit is further configured to:

adjust the latest online feature using an online machine learning algorithm (FTRL), so that the latest online feature is adapted to be used as the online sample feature for feature encoding.

In some alternative implementations of the present embodiment, the offline recommendation model is a Wide&Deep model, and the offline training unit is further configured to: input the offline sample feature of the user into a Deep layer; input the online sample feature after feature engineering into a Wide layer; and splice a Wide layer feature and a Deep layer feature and input the spliced feature into a logic regression for prediction training, to obtain the trained offline recommendation model.

In some alternative implementations of the present embodiment, the online training unit is further configured to: adjust a Wide layer parameter, so that the latest online feature is adapted for use as the online sample feature to be input into the Wide layer.

According to an embodiment of the present disclosure, the present disclosure also provides an electronic device and a readable storage medium.

Figure 7:
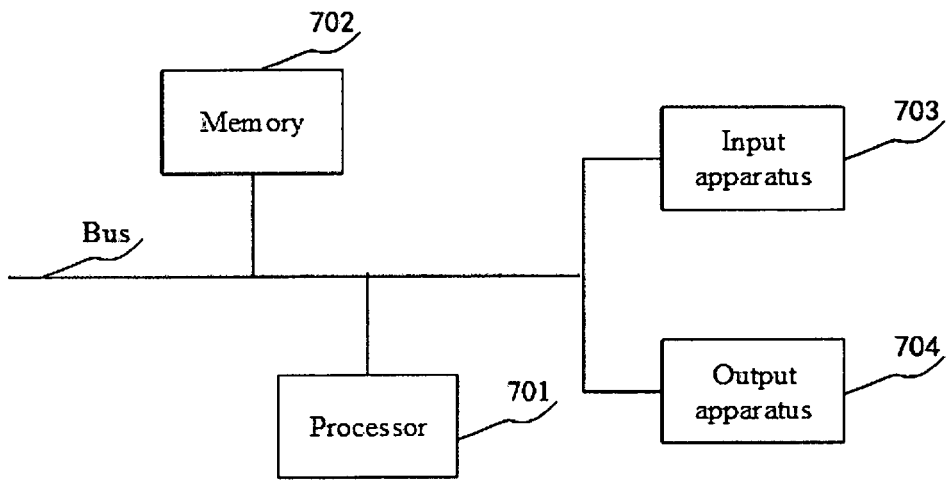
FIG. 7 is a block diagram of an electronic device used to implement the method for training an online prediction model according to an embodiment of the present disclosure.

As shown in FIG. 7, is a block diagram of an electronic device of the method for training an online prediction model according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/ or claimed herein.

As shown in FIG. 7, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 7, one processor 701 is used as an example.

The memory 702 is a non-transitory computer readable storage medium provided by the embodiment of the present disclosure. The memory stores instructions executable by at least one processor, so that the at least one processor performs the method for training an online prediction model provided by the embodiment of the present disclosure. The non-transitory computer readable storage medium of the present disclosure stores computer instructions for causing a computer to perform the method for training an online prediction model provided by the present disclosure.

The memory 702, as a non-transitory computer readable storage medium, may be used to store non-transitory software programs, non-transitory computer executable programs and modules, such as program instructions/modules corresponding to the method for training an online prediction model in the embodiments of the present disclosure (for example, the acquisition unit 601, the offline training unit 602, the online training unit 603 and the model generation unit 604 as shown in FIG. 6). The processor 701 executes the non-transitory software programs, instructions, and modules stored in the memory 702 to execute various functional applications and data processing of the server, that is, to implement the method for training an online prediction model in the foregoing method embodiments.

The memory 702 may include a storage program area and a storage data area, where the storage program area may store an operating system and at least one function required application program; and the storage data area may store data created by the use of the electronic device according to the method for training an online prediction model, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device of the method for training an online prediction model through a network. Examples of the above network include but are not limited to the Internet, intranet, local area network, mobile communication network, and combinations thereof.

The electronic device of the method for training an online prediction model may further include: an input apparatus 703 and an output apparatus 704. The processor 701, the memory 702, the input apparatus 703, and the output apparatus 704 may be connected through a bus or in other methods. In FIG. 7, connection through a bus is used as an example.

The input apparatus 703 may receive input digital or character information, and generate key signal inputs related to user settings and function control of the electronic device of the method for training an online prediction model, such as touch screen, keypad, mouse, trackpad, touchpad, pointing stick, one or more mouse buttons, trackball, joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

The method and apparatus for training an online prediction model, the device, and the storage medium provided by the embodiments of the present disclosure, first acquiring an offline sample feature and an online sample feature of a user, the offline sample feature including a user portrait feature; secondly, offline training to obtain an offline recommendation model, based on the offline sample feature and the online sample feature of the user; then acquiring a latest online feature of the user, and online training to obtain an online learning model based on the latest online feature of the user, the online learning model being used to adapt the latest online feature for use as an online sample feature to be input into the trained offline recommendation model; and synchronizing the offline recommendation model to online, and inputting the latest online feature output by the online learning model into the offline recommendation model to generate an online prediction model. Therefore, the online prediction model is optimized by using online sample data of the user, which improves a fitting effect and generalization effect of the recommendation model, and may be applied but not limited to cloud computing scenarios.

It should be understood that the steps of reordering, adding or deleting may be performed using the various forms shown above. For example, the steps described in the present disclosure may be performed in parallel or sequentially or in a different order, so long as the desired results of the technical solution disclosed in the present disclosure may be realized, and no limitation is imposed herein.

The foregoing detailed description is not intended to limit the scope of the present disclosure. It will be appreciated by those skilled in the art that various modifications, combinations, sub-combinations, and substitutions may be made depending on design requirements and other factors. Any modifications, equivalents, and modifications that fall within the spirit and principles of the present disclosure are intended to be included within the scope of the present disclosure.

What is claimed is:

1. A method for training an online prediction model, the method comprising:

acquiring an offline sample feature and an online sample feature of a user, the offline sample feature comprising a user portrait feature, the acquiring the online sample feature comprising determining the online sample feature of the user based on a user online real-time behavior, wherein the user online real-time behavior comprises a user online operation behavior;

offline training a Wide&Deep model based on both the offline sample feature and the online sample feature of the user, to obtain an offline recommendation model, the offline training the Wide&Deep model comprising:

inputting the offline sample feature of the user into a Deep layer of the Wide&Deep model to generate a Deep layer feature, wherein the Deep layer is a deep neural network;

inputting the online sample feature after feature engineering into a Wide layer of the Wide&Deep model to generate a Wide layer feature, wherein the Wide layer is a wide linear model; and splicing the Wide layer feature and the Deep layer feature to obtain a spliced feature and inputting the spliced feature into a logic regression for prediction training, to obtain a trained offline recommendation model;

acquiring a latest online feature of the user, and online training the Wide&Deep model based on the latest online feature of the user to obtain an online learning model by: adjusting a Wide layer parameter of the Wide&Deep model, so that the latest online feature is adapted for use as the online sample feature to be input into the Wide layer, the online learning model being used to adapt the latest online feature for use as an online sample feature to be input into the trained offline recommendation model;

converting the offline recommendation model to an online recommendation model, and inputting the latest online feature output by the online learning model into the online recommendation model to generate an online prediction model; and determining a recommended ranking or a click-through rate estimation in a recommendation system, based on an output of the online prediction model.

2. The method according to claim 1, wherein the method further comprises:

synchronizing the latest online feature of the user to an offline feature library, wherein the offline feature library stores the offline sample feature of the user.

3. The method according to claim 2, further comprising:

using the synchronized latest online feature as the online sample feature to continue offline training the offline recommendation model.

4. The method according to claim 3, further comprising:

synchronizing the online sample feature of the user to the offline feature library, and using the synchronized online sample feature as the offline sample feature.

5. The method according to claim 1, wherein the online training to obtain an online learning model based on the latest online feature of the user, comprises:

adjusting the latest online feature using an online machine learning algorithm (FTRL), so that the latest online feature is adapted to be used as the online sample feature for feature encoding.

6. The method according to claim 1, wherein:

the user portrait feature comprises at least one of: user income, user surfing online times, user search times, user search keyword, user clicked website address, or user interest tag; and the online sample feature comprises a keyword on the internet searched by the user.

7. The method according to claim 1, wherein the latest online feature of the user comprises:

current real-time operation behavior of the user, which comprises current search keyword of the user, current clicked website address of the user, and feedback on current advertising display of the user.

8. The method according to claim 1, further comprising:

calculating, by programmed circuitry, a loss between the click-through estimation rate and an actual click-through rate, or between the recommended ranking output based on the offline recommendation model and actual recommended ranking, based on the loss, and using, by programmed circuitry, a gradient descent method to iteratively optimize a parameter of the offline recommendation model.

9. The method according to claim 1, wherein the method is used in a recommendation system deployed in a cloud computing environment, which provides as real-time output the click through rate estimation, or the recommended ranking for products, for the user in an online e-commerce scenario.

10. An electronic device, comprising:

one or more processors; and a storage apparatus storing one or more programs, wherein the one or more programs, when executed by the one or more processors, cause the one or more processors to perform operations, the one or more programs comprising instructions which instruct the one or more processors to perform the operations, and the instructions comprising:

an instruction to acquire an offline sample feature and an online sample feature of a user, the offline sample feature comprising a user portrait feature, and the instruction to acquire the online sample feature comprising an instruction to determine the online sample feature of the user based on a user online real-time behavior, wherein the user online real-time behavior comprises a user online operation behavior;

an instruction to offline train a Wide&Deep model based on both the offline sample feature and the online sample feature of the user, to obtain an offline recommendation model, wherein the instruction to offline train the Wide&Deep model comprises:

an instruction to input the offline sample feature of the user into a Deep layer of the Wide&Deep model to generate a Deep layer feature, wherein the Deep layer is a deep neural network;

an instruction to input the online sample feature after feature engineering into a Wide layer of the Wide&Deep model to generate a Wide layer feature, wherein the Wide layer is a wide linear model; and an instruction to splice the Wide layer feature and the Deep layer feature to obtain a spliced feature and input the spliced feature into a logic regression for prediction training, to obtain a trained offline recommendation model;

an instruction to acquire a latest online feature of the user, and online train the Wide&Deep model based on the latest online feature of the user to obtain an online learning model by: adjusting a Wide layer parameter of the Wide&Deep model, so that the latest online feature is adapted for use as the online sample feature to be input into the Wide layer, the online learning model being used to adapt the latest online feature for use as an online sample feature to be input into the trained offline recommendation model, an instruction to convert the offline recommendation model to an online recommendation model, and input the latest online feature output by the online learning model into the online recommendation model to generate an online prediction model; and an instruction to determine a recommended ranking or a click-through rate estimation in a recommendation system, based on an output of the online prediction model.

11. The electronic device according to claim 10, wherein the instructions further comprise:

an instruction to synchronize the latest online feature of the user to an offline feature library, wherein the offline feature library stores the offline sample feature of the user.

12. The electronic device according to claim 11, wherein the instructions further comprise:

an instruction to use the synchronized latest online feature as the online sample feature to continue offline training the offline recommendation model.

13. The electronic device according to claim 12, wherein the instructions further comprise:

an instruction to synchronize the online sample feature of the user to the offline feature library, and use the synchronized online sample feature as the offline sample feature.

14. The electronic device according to claim 10, wherein:

the user portrait feature comprises at least one of: user income, user surfing online times, user search times, user search keyword, user clicked website address, or user interest tag; and the online sample feature comprises a keyword on the internet searched by the user.

15. The electronic device according to claim 10, wherein the latest online feature of the user comprises:

current real-time operation behavior of the user, which comprises current search keyword of the user, current clicked website address of the user, and feedback on current advertising display of the user.

16. The method according to claim 10, wherein the instruction to input the offline sample feature of the user into a Deep layer comprises:

an instruction to input the offline sample feature without performing feature engineering on the offline sample feature.

17. The electronic device according to claim 10, wherein the electronic device is used in a recommendation system deployed in a cloud computing environment, which provides as real-time output the click through rate estimation, or the recommended ranking for products, for the user in an online e-commerce scenario, wherein inputting the offline sample feature into the deep layer uses a horizontal splicing to obtain a multi thousand dimension feature.

18. A non-transitory computer readable storage medium, storing a computer program thereon, wherein the program, when executed by a processor, cause the processor to perform operations, the one or more programs comprising instructions which instruct the one or more processors to perform the operations, and the instructions comprising:

an instruction to acquire an offline sample feature and an online sample feature of a user, the offline sample feature comprising a user portrait feature, the acquiring the online sample feature comprising determining the online sample feature of the user based on a user online real-time behavior, wherein the user online real-time behavior comprises a user online operation behavior;

an instruction to offline train a Wide&Deep model based on both the offline sample feature and the online sample feature of the user, to obtain an offline recommendation model, wherein the instruction to offline train the Wide&Deep model comprises:

an instruction to input the offline sample feature of the user into a Deep layer of the Wide&Deep model to generate a Deep layer feature, wherein the Deep layer is a deep neural network;

an instruction to input the online sample feature after feature engineering into a Wide layer of the Wide&Deep model to generate a Wide layer feature, wherein the Wide layer is a wide linear model; and an instruction to splice the Wide layer feature and the Deep layer feature to obtain a spliced feature and input the spliced feature into a logic regression for prediction training, to obtain a trained offline recommendation model;

an instruction to acquire a latest online feature of the user, and online training the Wide&Deep model based on the latest online feature of the user to obtain an online learning model by: adjusting a Wide layer parameter of the Wide&Deep model, so that the latest online feature is adapted for use as the online sample feature to be input into the Wide layer, the online learning model being used to adapt the latest online feature for use as an online sample feature to be input into the trained offline recommendation model;

an instruction to convert the offline recommendation model to an online recommendation model, and inputting the latest online feature output by the online learning model into the online recommendation model to generate an online prediction model; and an instruction to determine a recommended ranking or a click-through rate estimation in a recommendation system, based on an output of the online prediction model.

* * * * *